(12) United States Patent
Schneider

(10) Patent No.: US 10,308,205 B2
(45) Date of Patent: Jun. 4, 2019

(54) SAFETY RESTRAINT SYSTEM WITH AN AIRBAG HAVING AN INFLATABLE PELVIS RESTRAINT PORTION AND RELATED METHOD

(71) Applicant: AUTOLIV ASP, INC., Ogden, UT (US)

(72) Inventor: David Schneider, Waterford, MI (US)

(73) Assignee: AUTOLIV ASP, INC., Ogden, UT (US)

( * ) Notice: Subject to any disclaimer, the term of this patent is extended or adjusted under 35 U.S.C. 154(b) by 205 days.

(21) Appl. No.: 14/988,831

(22) Filed: Jan. 6, 2016

(65) Prior Publication Data
US 2017/0190311 A1 Jul. 6, 2017

(51) Int. Cl.
| | | |
|---|---|---|
| *B60N 2/427* | (2006.01) | |
| *B60R 21/207* | (2006.01) | |
| *B60R 21/2338* | (2011.01) | |

(52) U.S. Cl.
CPC ........ *B60R 21/207* (2013.01); *B60N 2/42763* (2013.01); *B60R 21/2338* (2013.01); *B60R 2021/23386* (2013.01)

(58) Field of Classification Search
CPC ..... B60R 22/18; B60R 21/233; B60R 21/207; B60R 2021/161; B60N 2/42763
See application file for complete search history.

(56) References Cited

U.S. PATENT DOCUMENTS

| | | | | |
|---|---|---|---|---|
| 5,020,856 A * | 6/1991 | George | ................... | B60R 22/18 280/801.1 |
| 5,282,672 A * | 2/1994 | Borlinghaus | ........... | B60R 22/18 280/806 |
| 2001/0011810 A1* | 8/2001 | Saiguchi | .............. | B60N 2/4221 280/728.1 |
| 2006/0261579 A1* | 11/2006 | Breed | ................... | B60R 21/205 280/729 |
| 2012/0038137 A1* | 2/2012 | Wipasuramonton | .... | B60R 21/18 280/733 |
| 2013/0313811 A1* | 11/2013 | Ichida | ..................... | B60R 21/18 280/733 |
| 2014/0265263 A1* | 9/2014 | Shankar | ............. | B60N 2/42718 280/728.2 |
| 2016/0059814 A1* | 3/2016 | Schneider | ............. | B60R 21/207 280/733 |

(Continued)

FOREIGN PATENT DOCUMENTS

WO WO-2012058422 A1 * 5/2012 ............. B60R 21/18

OTHER PUBLICATIONS

U.S. Appl. No. 14/824,227, titled Safety Restraint System With Inflatable Pelvis Restraint Device, filed Aug. 12, 2015.

*Primary Examiner* — Karen Beck

(74) *Attorney, Agent, or Firm* — Stephen T. Olson; Harenss, Dickey & Pierce, P.L.C.

(57) ABSTRACT

A safety restraint system for a vehicle seat having a frame, a seat back and a lower seat cushion supported on the frame includes an airbag having an inflatable pelvis restraint portion. The inflatable pelvis restraint portion extends across the lower seat cushion between a first lateral side and a second lateral side of the inflatable pelvis restraint portion. At least one of the first and second lateral sides is laterally movable relative to the lower seat cushion upon inflation of the airbag. The inflatable portion may be secured to the vehicle seat with a mounting strap.

10 Claims, 4 Drawing Sheets

(56) References Cited

U.S. PATENT DOCUMENTS

| | | |
|---|---|---|
| 2016/0059818 A1 | 3/2016 | Witt et al. |
| 2016/0059819 A1 | 3/2016 | Witt et al. |
| 2016/0075299 A1 | 3/2016 | Wang et al. |
| 2017/0043740 A1* | 2/2017 | Schneider ............. B60R 21/231 |
| 2017/0225649 A1* | 8/2017 | Jaradi ................. B60R 22/1952 |

* cited by examiner

SAFETY RESTRAINT SYSTEM WITH AN AIRBAG HAVING AN INFLATABLE PELVIS RESTRAINT PORTION AND RELATED METHOD

FIELD

The present disclosure relates to safety restraint systems. More particularly, the present disclosure pertains to a safety restraint system having an airbag with an inflatable pelvis restraint portion and to a related method.

BACKGROUND

This section provides background information related to the present disclosure which is not necessarily prior art.

Various passive and active automotive occupant restraint systems are known for enhancing occupant protection in the event of a vehicle impact. Passive systems are deployed with no action required by the occupant and include inflatable restraints or airbags for frontal and side impacts, for example. Automatically deployed seat belt systems are also known. Active systems, such as seat belts, have been used for many decades and are manually deployed by the occupant.

Conventional seat belt systems use three points of connection with the vehicle structure and incorporate a lap belt portion for engaging the occupant's lower torso and a shoulder belt portion for engaging the occupant's upper torso. When used, the seat belt restrains movement of the occupant in the event of a vehicle impact or rollover event. In order to enhance the comfort and convenience provided by the seat belt system, retractors are used which permit belt webbing to be extracted from and retracted into the retractor, allowing movement of the occupant while maintaining the belt in close contact with the occupant.

A more recent development in the area of passive restraints relates to pelvis restraint. An inflatable device may be disposed below a seat cushion. The device may be activated upon sensing predetermined dynamic characteristics of the vehicle (e.g., an actual or impending impact or rollover event. The airbag generally applies an upward directed force to the seat cushion, may restrain the pelvis of a seat occupant from forward movement and may absorb energy. Commonly owned U.S. Ser. No. 14/470,001 filed 27 Aug. 2014 teaches an inflatable pelvis restraint device having a flexible member extending laterally across the seat cushion and having a first end and a second end. The flexible member includes at least a portion that is inflatable for increasing a height of the seat proximate a forward edge of the seat. In one embodiment, both the first and second ends are attached to the frame. U.S. Ser. No. 14/470,001 is incorporated by reference as if fully set forth herein.

While known safety restraint systems have generally proven to be acceptable for their intended uses, a continuous need for improvement exists in the relevant art.

SUMMARY

This section provides a general summary of the disclosure, and is not a comprehensive disclosure of its full scope or all of its features.

In accordance with one aspect, the present teachings provide a safety restraint system in combination with a vehicle seat. The safety restraint system includes an airbag having an inflatable pelvis restraint portion extending across the lower seat cushion in a lateral direction between a first lateral side and a second lateral side of the inflatable pelvis restraint portion. At least one of the first and second lateral sides is laterally movable relative to the lower seat cushion upon inflation of the inflatable pelvis restraint portion.

In accordance with another aspect, the present teachings provide a safety restraint system in combination with a vehicle seat having a seat including a frame, a seat back and a seat cushion supported on the frame. The safety restraint system includes a mounting strap and an airbag. The mounting strap includes first and second ends secured to the seat. The airbag has an inflatable pelvis restraint portion and is secured to the seat with the mounting strap such that at least one side of the inflatable pelvis restraint translates relative to the strap during deployment of the airbag.

In accordance with yet another aspect, the present teachings provide a method of protecting an occupant of a vehicle seat having a seat cushion. The method includes mounting an airbag to the vehicle seat such that the airbag at least partially extends laterally across the vehicle seat between first and second lateral sides of the airbag. The method additionally includes inflating the airbag in response to predetermined sensed vehicle conditions. The method further includes simultaneously translating at least one of the first and second lateral sides of the airbag relative to the vehicle seat upon inflation of the airbag to accommodate radial expansion of the airbag.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Figure 1:
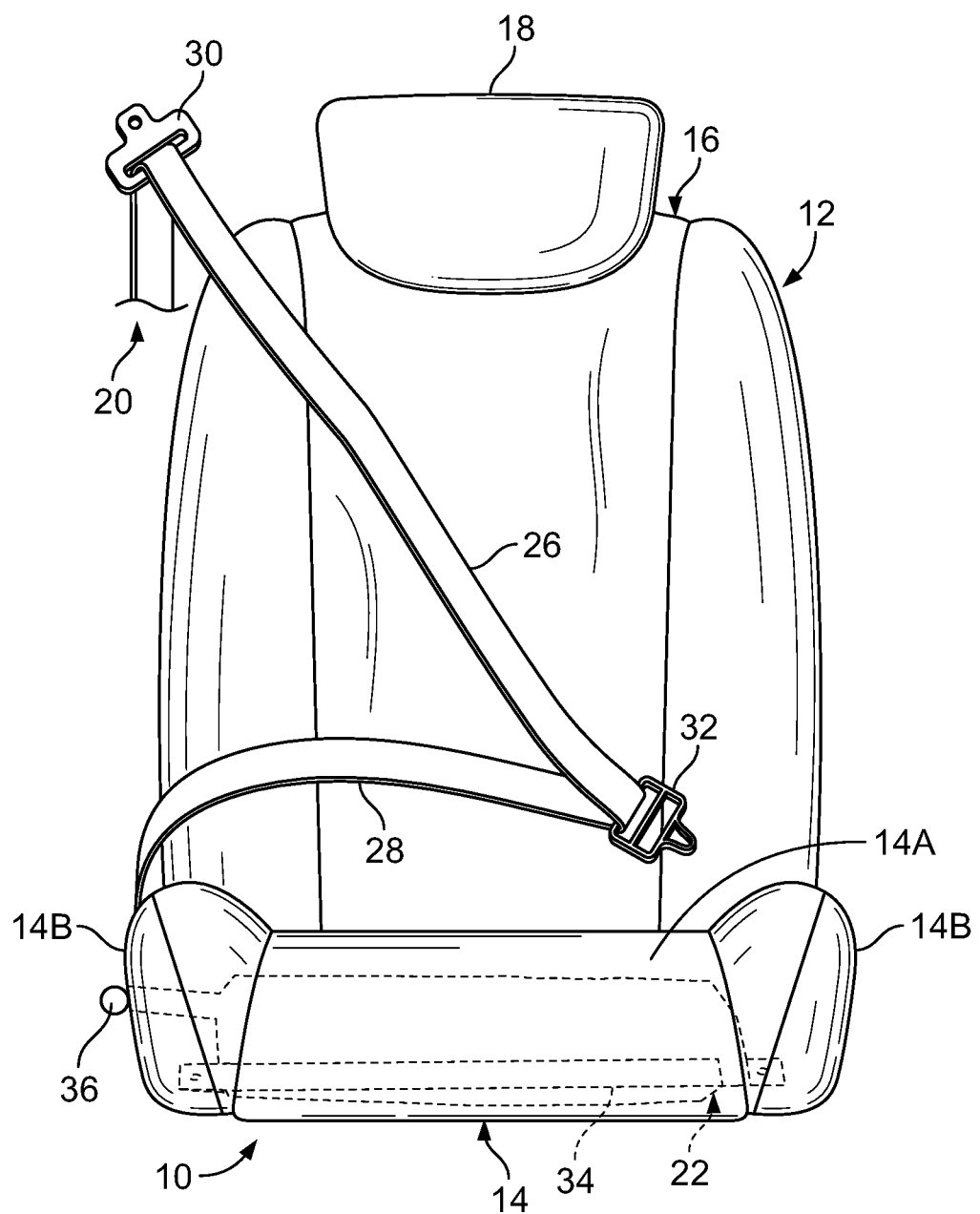
FIG. 1 is a front view of a safety restraint system in accordance with the present teachings and including an airbag having an inflatable pelvis restraint portion, the safety restraint system shown operatively associated with a vehicle seat and shown prior to inflation/deployment of the airbag.

Example embodiments will now be described more fully with reference to the accompanying drawings.

Example embodiments are provided so that this disclosure will be thorough and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that the example embodiment should not be construed to limit the scope of the present disclosure. Well-known processes, well-known device structures, and well-known technologies are not described herein in detail.

With initial reference to FIGS. 1 through 5, a safety restraint system constructed in accordance with the present teachings is illustrated and generally identified at reference character 10. The restraint system 10 is shown operatively associated with a seat 12 of a motor vehicle. It will be understood that the particular seat 12 illustrated is merely exemplary. In this regard, the present teachings may be adapted to various other seats. For example, the present teachings may be adapted for use in front or rear seats in motor vehicles. While the vehicle seat 12 is illustrated as a bucket seat, it will be understood that the present teachings may be readily adapted to a bench seat. The present teachings may also be adapted for use in aviation and other seating environments.

Except as otherwise described herein, it will be understood that the vehicle seat 12 shown throughout the drawings is conventional in construction. Briefly, the vehicle seat 12 is illustrated to generally include a lower seat cushion 14, an upwardly extending seat back 16 and a headrest 18. The lower seat cushion 14 may include a central seat cushion portion 14A and first and second bolster portions 14B disposed on opposite lateral sides of the central seat cushion portion 14A.

The safety restraint system 10 is illustrated to generally include a seat belt system 20 and an airbag 22 having an inflatable pelvis restraint portion 24. In the embodiment illustrated, it will be understood that the seat belt system 20 and the airbag 22 cooperate with one another to protect an occupant of the seat 12, but are otherwise independent from each other. The seat belt system 20 generally includes a webbing having an upper shoulder belt portion 26 and a lower lap belt portion 28. The shoulder belt portion 26 may pass through a "D" ring 30 which is typically mounted to the "B" pillar of the motor vehicle (the vertical structural member separating the front and rear doors of a four-door vehicle). A seat belt latch plate or tongue 32 is slidably carried by the seat belt webbing 24 and is received by a seat belt buckle (not shown). The seat belt buckle may be attached to the vehicle floor pan or the seat 12 in a conventional manner. In a conventional manner, a first free end of the webbing may be anchored to the seat 12 or floor pan of the vehicle and a second free end of the webbing may be associated with a retractor. One suitable retractor is shown and described in commonly assigned U.S. Pat. No. 7,607,687. U.S. Pat. No. 7,607,687 is hereby incorporated by reference as if fully set forth herein.

In the embodiment illustrated, the airbag 22 will be understood to include a single inflatable member inflatable by an inflator 36. The inflator 36 and the manner in which inflation gas is delivered to the airbag 22 will be understood to be conventional to the extent not otherwise described herein. In this regard, the safety restraint system 10 may be adapted for use with various known inflators.

The airbag 22 will be understood to be flexible. By describing the airbag 22 as flexible, it will be understood that the airbag 22 may be constructed of a flexible material (i.e., a material that is not shape retaining) such as a woven material. For example, the airbag 22 may be woven from conventional materials suitable for airbags. In the embodiments herein, the airbag 22 does not include any memory retaining materials, such as metal or the like.

The airbag 22 includes the inflatable pelvis restraint portion 24 and an inlet portion 38. The inlet portion 38 receives an outlet portion of the inflator 36. The inflator 36 may be mounted externally to the lower seat cushion 14 and thereby removed from the area loaded by a seat occupant 40. Such a location may enable use of a more comfortable seat, which may have thicker (and softer) foam and/or a lower seat pan angle (or no seat pan angle). In this manner, the present teachings offer improved design flexibility for vehicle seats in addition to potential reduction in weight due to less structural seat pan requirements.

The inflatable pelvis restraint portion 24 of the airbag 22 may be generally rectangular in shape, for example, and may extend substantially across the seat cushion 14 in a lateral direction. In the embodiment illustrated, the inflatable restraint portion 24 extends across and below the lower seat cushion 14 in a lateral direction between a first lateral side 24A and a second lateral side 24B of the inflatable pelvis restraint portion 24. Upon inflation, the pelvis restraint portion 24 provides the structure for pelvis restraint in addition to energy absorption during occupant loading by supporting and lifting the legs of a seat occupant 40.

The inflatable pelvis restraint portion 24 of the airbag 22 may extend at least substantially across a lateral width of the central seat cushion portion 14A of the seat 12. The airbag 22 may be located between the seat pan and the lower seat cushion 14. The airbag 22 may lie flat against the seat pan. In some applications, the airbag 22 may be folded. Alternatively, the airbag 22 may be located within the foam of the central seat cushion portion 14A of the seat 12. In this regard, the airbag 22 may be disposed within a channel or slot defined in the cushion portion 14A. Also, alternatively, the airbag 22 may be located between the cushion portion 14A and a seat cover material. In any event, the airbag 22 may be positioned proximate a forward edge of the seat 12 such that the inflatable restraint portion 24 functions to increase a height of the seat 12 proximate the forward edge upon inflation/deployment. The inflatable restraint system 10 of the present teachings may be similarly used with seats that do not include side bolster portions.

In the particular application illustrated, the inflatable pelvis restraint portion 24 of the airbag 22 may have a length in a cross-car direction of approximately 500 mm and a width perpendicular thereto of approximately 200 mm.

The airbag 22 may be mounted to the vehicle seat 12 with a mounting strap 40. The strap 40 may serve to allow at least one of the lateral sides 24A and 24B of the inflatable pelvis restraint portion 24 to laterally move (or slide) relative to the vehicle seat 12. The strap 40 may include a first end 40A and a second end 40B. In the embodiment illustrated, the first end 40A may be mounted to the vehicle seat 12 (e.g., to the seat pan) at an outboard side of the vehicle seat 12 and the second end 40B may be mounted to the vehicle seat 12 (e.g., again to the seat pan) at an inboard side of the vehicle seat 12. Alternatively, the ends 40A and 40B may be mounted to forward and rearward sides of the vehicle seat 12. The mounting to the seat 12 may be done with bolts or in any other suitable manner.

The strap 40 may be routed through a slot 42 in a non-inflatable portion of the airbag 22. The strap 40 may extend below the airbag 22 and allow the airbag 40 to translate there along upon inflation/deployment. The strap 40 may provide additional support for the airbag 22. The strap 40 may be constructed of seatbelt webbing or other suitable material attached to the airbag 22. Alternatively the strap 40 may be integrally formed with the airbag 22 (one-piece woven or cut-sewn).

As noted above, the present teachings may be adapted for use with any inflator capable of supplying a source of gas to the airbag 22 in response to sensing of a predetermined vehicle condition. Suitable inflators are commercially available from the assignee of this application. A vehicle restraint system controller (not shown) may automatically send signals to actuate the inflator to inflate the airbag 22. Details of the inflator 36 and the vehicle restraint system controller are beyond the scope of the present teachings and will be readily apparent to those of ordinary skill in the art.

Figure 2:
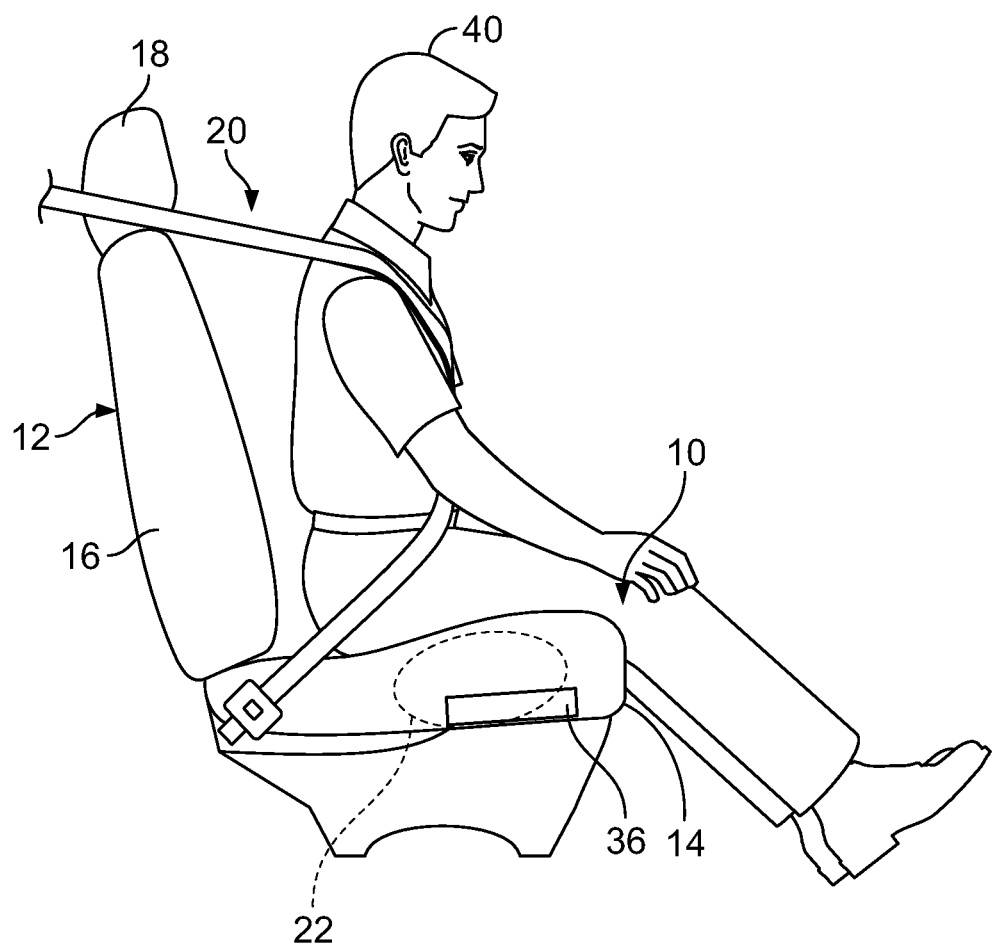
FIG. 2 is a side view of the inflatable restraint system and vehicle seat of FIG. 1, the airbag shown inflated/deployed with the inflatable restraint portion assisting to restrain an occupant of the vehicle seat.
Figure 3:
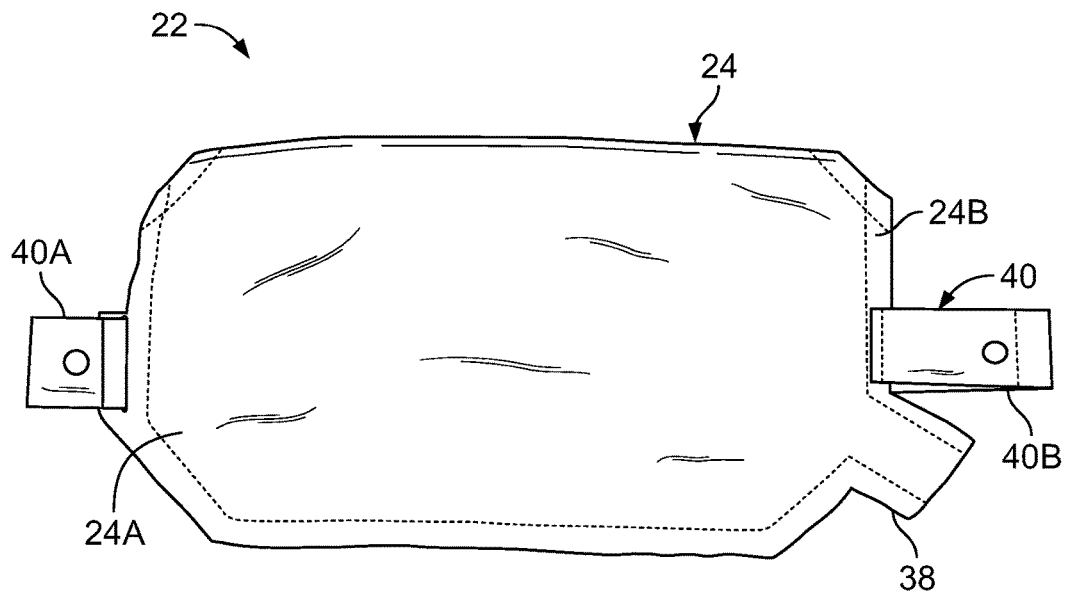
FIG. 3 is a top view of the airbag of FIGS. 1 and 2, the airbag shown prior to inflation and removed from the vehicle seat for purposes of illustration.
Figure 4:
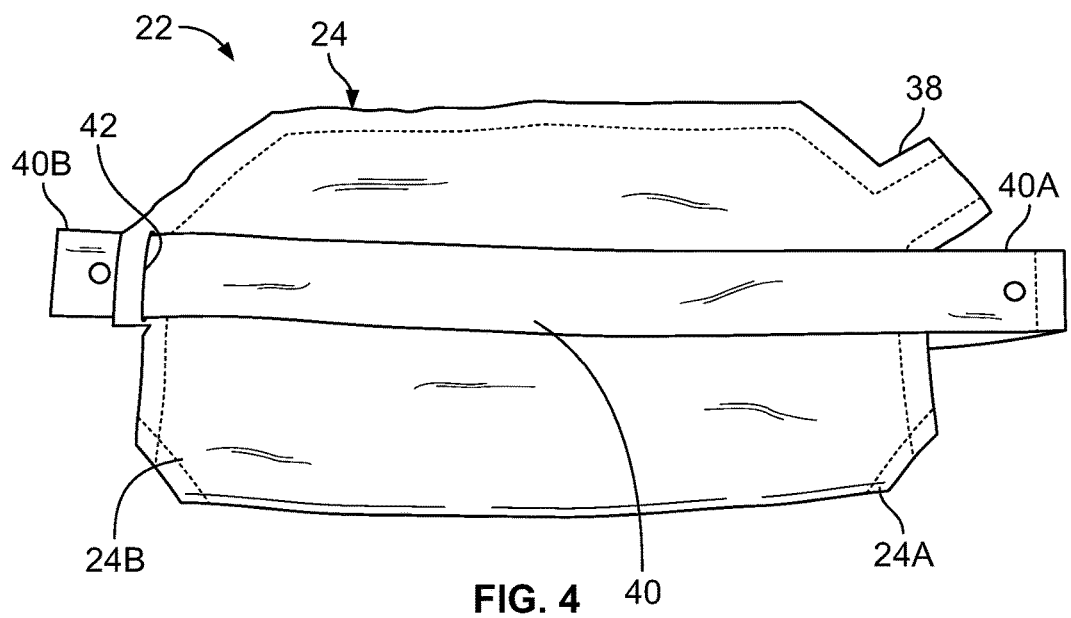
FIG. 4 is a bottom view of the airbag of FIG. 3, the airbag again shown prior to inflation and removed from the vehicle seat for purposes of illustration.
Figure 5:
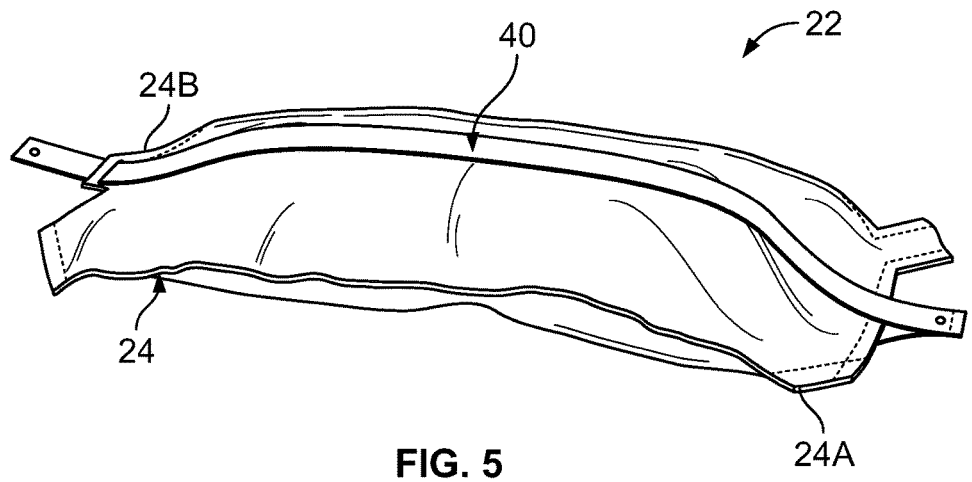
FIG. 5 is a bottom perspective view of the airbag of FIGS. 3 and 4, the airbag shown inflated and removed from the vehicle seat for purposes of illustration.

Upon sensing of a predetermined vehicle condition (e.g., crash or impending crash), the vehicle restraint system controller actuates the inflator 36 to inflate the airbag 22. A non-activated or uninflated condition of the airbag 22 is shown in FIGS. 1, 3 and 4. An actuated or inflated condition of the airbag 22 is shown in FIGS. 2 and 5.

Figure 6:
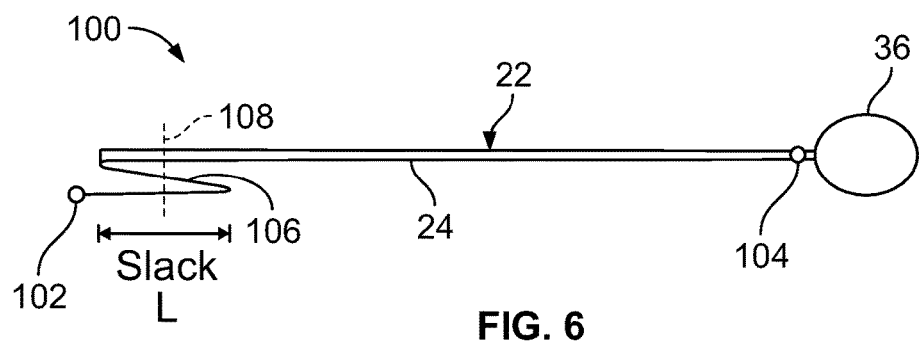
FIG. 6 is a schematic view of another inflatable restraint system in accordance with the present teachings, an airbag of the inflatable restraint system shown prior to inflation/deployment.
Figure 7:
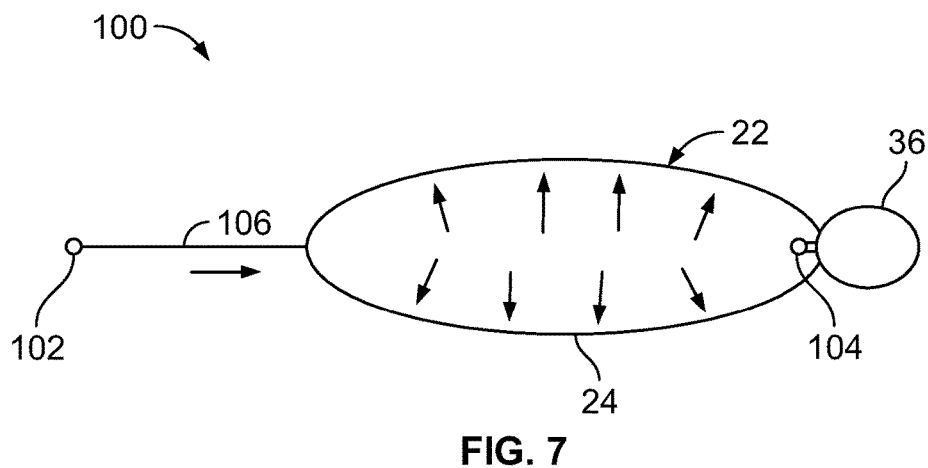
FIG. 7 is another schematic view of the inflatable restraint system of FIG. 6, the airbag shown after inflation/deployment.

With reference to the schematic view of FIGS. 6 and 7, another inflatable restraint system in accordance with the present teachings is illustrated and identified at reference character 100. Given the similarities between the restraint systems 10 and 100, common reference characters will be used throughout the various views to identify similar elements. The safety restraint system 100 differs from the safety restraint system 10 in that the airbag 22 may be mounted to the vehicle seat at first and second mounting points 102 and 104 such that slack is provided between at least one of the mounting points 102 and 104 and the airbag 22 upon inflation/deployment of the airbag 22. In the embodiment illustrated, the airbag 22 may be secured to the first mounting point 102 through an adjustable length member 106. The adjustable length member 106 may be a non-inflatable portion of the airbag 22 that is folded over on itself. Alternatively, the adjustable length member 106 may be a strap formed separate from or integrally with the airbag 22. Alternatively, the adjustable length member may be formed from a material with higher elongation properties (i.e., elastic-type material) or through fabric construction (e.g., weave orientation, density, or the like). The stored configuration may be retained with a tack stitch 106, for example. The adjustable length member 106 has a slack having a length L. This slack allows for radial expansion of the inflatable pelvis restraint portion 24 of the airbag upon deployment. Without such slack or other adjustable mounting, the inflated height of the airbag 22 may be restricted due to tension forces in the airbag 22 between attachment points 102 and 104. In certain embodiments, the slack may have a length L of approximately 75 mm.

Accordingly, the present teachings provide a safety restraint system 10 in which an airbag 22 is mounted to the seat 12 in such a way that slack is introduced so that a height of the airbag 22 is not significantly limited due to tension in the airbag fabric from fixed mounting points. Introduction of this slack improves a deployed height of the inflatable pelvis restraint portion 24 for a common width due to a more circular cross section (as compared to oval). This improves the pelvis restraint. In addition, the sliding-type design of the present teachings allows the airbag 22 to adapt to environment and load conditions by translating along the strap in an amount dependent on radial expansion, without any need to have slack in the cushion. By removing this initial slack, the present teachings provide a flat package without localized area otherwise necessary to accommodate the slack and improved aesthetics, comfort and packaging space. The sliding strap design also provides an additional support/reaction surface for the inflatable restraint portion 24 of the airbag. This may be particularly advantageous for applications having limited seat pan support below the cushion.

The inflatable restraint systems of the present teachings include an inflatable pelvis restraint having at least one side that translates during deployment of the airbag. As illustrated in the above described embodiments, the side that translates is a lateral side of the inflatable pelvis restraint. It will be understood, however, that the present teachings may be readily adapted such that one of the laterally extending sides (i.e., perpendicular to the lateral sides) translates during deployment of the airbag.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure. For example, where the present teachings are used in connection with a bench seat, a single airbag may extend across all seating positions and may be deployed by a single inflator.

What is claimed is:

1. A safety restraint system in combination with a vehicle seat, the vehicle seat including a frame, a seat back and a lower seat cushion supported on the frame, the safety restraint system comprising:
    an airbag located below the seat cushion and including an inflatable pelvis restraint portion defining a single cavity substantially extending across the lower seat cushion in lateral direction between a first lateral side and a second lateral side of the inflatable pelvis restraint portion, at least one of the first and second lateral sides being laterally movable relative to the lower seat cushion upon inflation of the inflatable pelvis restraint portion,
    wherein the inflatable pelvis restraint portion is secured to the vehicle seat through an adjustable length member having a first end mounted to the seat at a position proximate one of the first and second lateral sides of the inflatable pelvis restraint portion and a second end secured to the airbag, the adjustable length member has a first length in the lateral direction between the first end and the airbag prior to deployment and a second, greater length between the first end and the airbag in the lateral direction in response to deployment of the airbag,
    wherein the adjustable length member is a flexible belt folded over on itself prior to deployment of the airbag.

2. The safety restraint system of claim 1, wherein the inflatable pelvis restraint portion is secured to the vehicle seat through an adjustable length member having a first end mounted to the seat at a position proximate one of the first and second lateral sides of the inflatable pelvis restraint portion and a second end secured to the airbag.

3. The safety restraint system of claim 2, wherein the adjustable length member has a first length in the lateral direction between the first end and the airbag prior to deployment and a second, greater length between the first end and the airbag in the lateral direction in response to deployment of the airbag.

4. The safety restraint system of claim 3, wherein the adjustable length member is a flexible belt folded over on itself prior to deployment of the airbag at a location below the airbag.

5. The safety restraint system of claim 1, wherein the airbag is fixedly mounted to the vehicle seat at first and second mounting points disposed on laterally opposite sides of the airbag.

6. The safety restraint system of claim 5, wherein a distance between the first and second mounting points is a fixed distance and lateral movement of the at least one of the first and second lateral sides of the inflatable restraint portion allows for radial expansion of the inflatable restraint portion by removing tension forces between the first and second mounting points.

7. A method of protecting an occupant of a vehicle seat, the vehicle seat including a seat cushion, the method comprising:
    mounting an airbag to the vehicle seat such that the airbag at least partially extends laterally across the vehicle seat between first and second lateral sides of the airbag;
    inflating an inflatable pelvis restraint portion of the airbag through an inlet portion located at one of the first and second lateral sides of the airbag in response to predetermined sensed vehicle conditions to thereby increase a height of the seat proximate a forward edge of the seat, the inflatable pelvis restraint portion having a single cavity extending substantially across the vehicle seat; and
    simultaneously translating at least one of the first and second lateral sides of the airbag relative to the vehicle seat upon inflation of the airbag to accommodate radial expansion of the inflatable pelvis restraint portion,
    wherein mounting of the airbag includes securing the inflatable restraint portion to the vehicle seat through an adjustable length member having a first end mounted to the seat at a position proximate one of the first and second lateral sides of the inflatable pelvis restraint portion and a second end secured to the airbag, the adjustable length member has a first length in the lateral direction between the first end and the airbag prior to deployment and a second, greater length between the first end and the airbag in the lateral direction in response to deployment of the airbag,
    wherein the adjustable length member is a flexible belt folded over on itself prior to deployment of the airbag.

8. The method of claim 7, wherein mounting the airbag to the vehicle seat includes mounting the airbag to the vehicle seat at first and second mounting points disposed on laterally opposite sides of the airbag.

9. The method of claim 8, wherein a distance between the first and second mounting points is a fixed distance and lateral movement of the at least one of the first and second lateral sides of the inflatable restraint portion allows for radial expansion of the inflatable restraint portion by removing tension forces between the first and second mounting points.

10. A safety restraint system in combination with a vehicle seat, the vehicle seat including a frame, a seat back and a lower seat cushion supported on the frame, the safety restraint system comprising:
    an airbag located below the seat cushion and including an inflatable pelvis restraint portion defining a single cavity substantially extending across the lower seat cushion in a lateral direction between a first lateral side and a second lateral side of the inflatable pelvis restraint portion, at least one of the first and second lateral sides being laterally movable relative to the lower seat cushion upon inflation of the inflatable pelvis restraint portion,
    a strap mounting the airbag to the vehicle seat, the strap including a first end mounted to the vehicle seat at an inboard side of the vehicle seat and a second end mounted to the vehicle seat at an outboard side of the vehicle seat, the strap passing through a slot defined in a non-inflatable portion of the airbag,
wherein at least one lateral side of the inflatable restraint portion laterally moves relative to the vehicle seat upon inflation.

* * * * *